(12) United States Patent
Ronald

(10) Patent No.: US 6,636,020 B1
(45) Date of Patent: Oct. 21, 2003

(54) LITHIUM-ION OVER VOLTAGE PROTECTION CIRCUIT

(75) Inventor: Timothy R. Ronald, Clarence, NY (US)

(73) Assignee: Wilson Greatbatch Technologies, Inc., Clarence, NY (US)

( * ) Notice: Subject to any disclaimer, the term of this patent is extended or adjusted under 35 U.S.C. 154(b) by 0 days.

(21) Appl. No.: 10/368,851

(22) Filed: Feb. 19, 2003

Related U.S. Application Data

(60) Provisional application No. 60/415,014, filed on Oct. 1, 2002.

(51) Int. Cl.[7] .................................................. H02J 7/00
(52) U.S. Cl. ...................................... 320/134; 320/128
(58) Field of Search ................................ 320/134, 128, 320/136, 163, 164, 165, 162; 324/426, 427

(56) References Cited

U.S. PATENT DOCUMENTS

| | | | |
|---|---|---|---|
| 5,539,299 A | 7/1996 | Fernandez et al. | 320/39 |
| 5,557,188 A | 9/1996 | Piercey | 320/5 |
| 5,637,413 A | 6/1997 | Fernandez et al. | 429/7 |
| 5,691,622 A | 11/1997 | Mack et al. | 320/29 |
| 5,695,886 A | 12/1997 | Dewan et al. | 429/7 |
| 5,705,911 A | 1/1998 | Tamai | 320/5 |
| 5,742,148 A | 4/1998 | Sudo et al. | 320/14 |
| 5,789,900 A | 8/1998 | Hasegawa et al. | 320/132 |
| 5,789,902 A | 8/1998 | Abe et al. | 320/134 |
| 5,883,495 A | 3/1999 | Smith et al. | 320/128 |
| 5,896,025 A | 4/1999 | Yamaguchi et al. | 320/134 |
| 5,909,104 A | 6/1999 | Scott | 320/136 |
| 5,963,019 A | 10/1999 | Cheon | 320/150 |
| 5,990,663 A | * 11/1999 | Mukainakano | 320/134 |
| 6,118,253 A | 9/2000 | Mukainakano et al. | 320/134 |
| 6,154,009 A | 11/2000 | Fujita et al. | 320/134 |

OTHER PUBLICATIONS

Texas Instruments Advertisement–Power Management–Li/ION/Li–Polymer Charge Manager Integrates MOSFET and Schottky Diode, Reducing Board Space Up to 65%.

* cited by examiner

*Primary Examiner*—Lawrence Luk
(74) *Attorney, Agent, or Firm*—Michael F. Scalise

(57) ABSTRACT

The present invention is directed to an overvoltage disconnect circuit for a lithium ion battery and/or cell. The lithium ion battery has at least one lithium ion battery cell having a rated voltage or a desired voltage, an input terminal, and being chargeable by a charger. The overvoltage disconnect circuit has (1) a switch unit, and (2 & 3) a first and second voltage dividers connected to (4) a comparator. The switch unit is in series with the lithium ion cell and the charger and the gate of the switch unit is connected to the comparator. The first voltage divider receives the voltage of the charger and generates a second charge. The second charge is proportionally below the voltage of the charger. The second voltage divider receives the voltage of the charger and generates a predetermined charge; the predetermined charge is proportionally below and sometimes less than the rated voltage or the desired voltage of the cell. The comparator compares the predetermined charge to the second charge. If the second charge is below the predetermined charge, the comparator transmits a an operational signal (which can be a non-signal) to the switch unit that allows the charger to continue charging the lithium ion cell; And if the second charge is equal to or greater than the predetermined charge, the comparator transmits the operational signal to the switch unit that disconnects the charger from charging the lithium ion cell.

20 Claims, 2 Drawing Sheets

LITHIUM-ION OVER VOLTAGE PROTECTION CIRCUIT

CROSS-REFERENCE TO RELATED APPLICATION

This application claims priority to U.S. provisional patent application Serial No. 60/415,014, filed Oct. 1, 2002.

BACKGROUND OF THE INVENTION

1. Field of the Invention

The present invention is directed to an over voltage protection circuit for at least one cell or battery.

2. Prior Art

Before filing this application, applicant conducted a patentability search to determine whether his invention was patentable over the cited references. These references are being provided to the U.S. Patent and Trademark Office. Of all the references, applicant believes that U.S. Pat. No. 5,695,886 to Dewan et al. is the most relevant.

Dewan et al. disclose "Lithium ion batteries are quickly gaining widespread popularity for powering portable electronic devices because of their superior energy density compared with more conventional battery systems such as nickel-cadmium and sealed lead-acid batteries. However, unlike the recent arrival of nickel-metal hydride batteries, lithium ion batteries require new charging regimes not used by any of the previous systems. Specifically, the lithium ion charge regime is a constant current to constant voltage regime. First, the lithium ion cells are charged with a constant current until a threshold voltage is reached, then the voltage is held constant by voltage regulation. The voltage regulation portion is critical. For optimum performance the voltage must be maintained within a very small tolerance, any less and the cells do not get fully charged, any more and the cells suffer significant overcharge." To address this issue, Dewan et al. developed an over voltage circuit design. The over voltage circuit design described by Dewan et al. is as follows:

The preferred over voltage control circuit [as illustrated in FIG. 1—prior art] comprises a comparator circuit 30, a voltage reference 32, a voltage divider 34, and a modifying switch 36 which modifies the voltage divider when the input signal is received. The comparator circuit 30 has a first input 38, such as a non-inverting input, and a second input 40, such as the inverting input. The voltage reference is connected to the first input, and provides a reference voltage $V_{ref}$. The voltage divider is connected between the positive terminal 18 and the negative terminal 20, and comprises an upper resistance 42 and a lower resistance 44 which form a midpoint node 48 connected to the second input 40 of the comparator circuit 30. The modifying switch 36 comprises a modifying resistance 46, switch transistor 50, and pull down resistance 54. The switch transistor is connected in series with the modifying resistance 46, which is coupled between the switch transistor and the midpoint node 48. The switch transistor input 52 is connected to the input line 22, and while no signal is applied to the input terminal 24, the voltage at the switch transistor input is pulled low by the pull down resistance 54.

To illustrate the operation of the overvoltage disconnect circuit, assume that the battery is first connected to a charger of the first type. That is, a charger not designed to recharge a lithium ion battery, and thus no signal is applied to the input terminal 24. As no input signal is received, the switch transistor 50, which is preferably an N-channel Metallic Oxide Semiconductor Field Effect Transistor (MOSFET), is open since its input 52 is pulled low. That is, it acts as a high impedance. Thus, modifying resistance 46 is essentially floating and has no effect on the voltage divider 34.

The divided voltage produced at the midpoint node 48 is fed to the second input 40 of the comparator and compared to the reference voltage fed to the first input 38. For a given battery voltage $V_{batt}$, the difference between the comparator inputs is a $V_1$. When the voltage fed to the second input is lower than the voltage fed to the first input, the voltage at the output 62, which is fed to the overvoltage switch, also preferably an N-channel MOSFET, is at a high level such that the overvoltage switch is closed, or low impedance, thus allowing conduction. When the battery voltage reaches the first predetermined level, the resistances of the voltage divider are chosen such that the voltage fed to the second input will exceed the voltage fed to the first input. As a result, the voltage at the output 62 drops to a low level, thus switching off the overvoltage switch and disconnecting the battery. (Bracketed material added for clarity.)

In other words, Dewan et al.'s circuitry assists in the prevention of uncontrolled over voltage conditions. This circuitry samples cell voltage and disables cell charge if the voltage exceeds the rated voltage or desired voltage. At which time, the damage to the lithium cell may have occurred.

Dewan et al. admit that the value for the rated voltage or desired voltage is obtained through a microprocessor, computer program or memory system. This statement can be confirmed in the following paragraph found in the '886 patent:

In practice it is typical that a lithium ion battery will have some auxiliary device 64, which will not be present in a conventional battery of the same form factor. As an example, it is common for a memory device to be included that contains information about the lithium ion battery, such as, for example, voltage regulation point, current level, charge capacity, etc. Since lithium ion is a relatively young battery cell chemistry, manufacturers of lithium ion cells use somewhat different chemical recipes, and often it is the case that cells manufactured by one maker require a first voltage regulation level, while those cells made by another maker require a second voltage regulation level. Since batteries may be constructed with either makers cells, it is imperative that the charger have correct charging parameters. As illustrated in [FIG. 1—prior art], it is possible to use the input terminal 24 for multiple uses. Here, the auxiliary device is a memory which is accessed by a charger of the second type when the battery is connected. The data is transferred relatively fast, and upon transference of data, the auxiliary line 26 of the charger is set to 5 volts, which will be sufficient to cause the switch transistor to close.

Along with the problems set forth above, there are other problems with the over voltage circuit protection devices illustrated and described by Dewan et al., and those shown and described in the other references. One of those problems is that those devices are too complicated—the necessity of a modifying switch that must be used in association with a voltage divider. Another problem is that these devices require a microprocessor, computer program or memory system to properly operate. Applicant has solved these problems.

SUMMARY OF THE INVENTION

The present invention is directed to an overvoltage disconnect circuit for a lithium ion battery and/or cell. The lithium ion battery has at least one lithium ion battery cell having a rated voltage or a desired voltage, an input terminal, and being chargeable by a charger. The overvoltage disconnect circuit has (1) a switch unit, and (2 & 3) a first and second voltage dividers connected to (4) a comparator. The switch unit is in series with the lithium ion cell and the charger and the gate of the switch unit is connected to the comparator. The first voltage divider receives the voltage of the charger and generates a second charge. The second charge is proportionally below the voltage of the charger. The second voltage divider receives the voltage of the charger and generates a predetermined charge; the predetermined charge is proportionally below and sometimes less than the rated voltage or the desired voltage of the cell. The comparator compares the predetermined charge to the second charge. If the second charge is below the predetermined charge, the comparator transmits a an operational signal (which can be a non-signal) to the switch unit that allows the charger to continue charging the lithium ion cell; And if the second charge is equal to or greater than the predetermined charge, the comparator transmits the operational signal to the switch unit that disconnects the charger from charging the lithium ion cell.

DETAILED DESCRIPTION OF THE INVENTION

Lithium ion cells are, for the most part, intolerant to over charge. Uncontrolled charging of these cells above the manufacturer's recommended voltage limit can result in a deterioration of cell performance and/or catastrophic cell failure. This protection circuit can be located on or near the header or top of the cell and be a fixed permanent part of the cell or battery. This protection circuit and cell can be used inside and outside an animal, for example, a human being or a house pet or a wild animal.

The circuitry of the present invention limits charging the cell or battery above the manufacturer's recommended voltage. In other words, this circuitry protects the cell or battery from an over voltage charge. For example, if a charger malfunction causes the cell to be charged above a certain voltage—4.25 V—, the protection circuit will voltage limit and current limit the charging path to the cell. Thereby, the present invention prevents the cell from a thermal overload and permanent internal damage.

How is this done without using a microprocessor or computer program? Simply, with a circuitry program that provides the desired results without extraneous instrumentation, equipment and apparatus.

Figure 1:
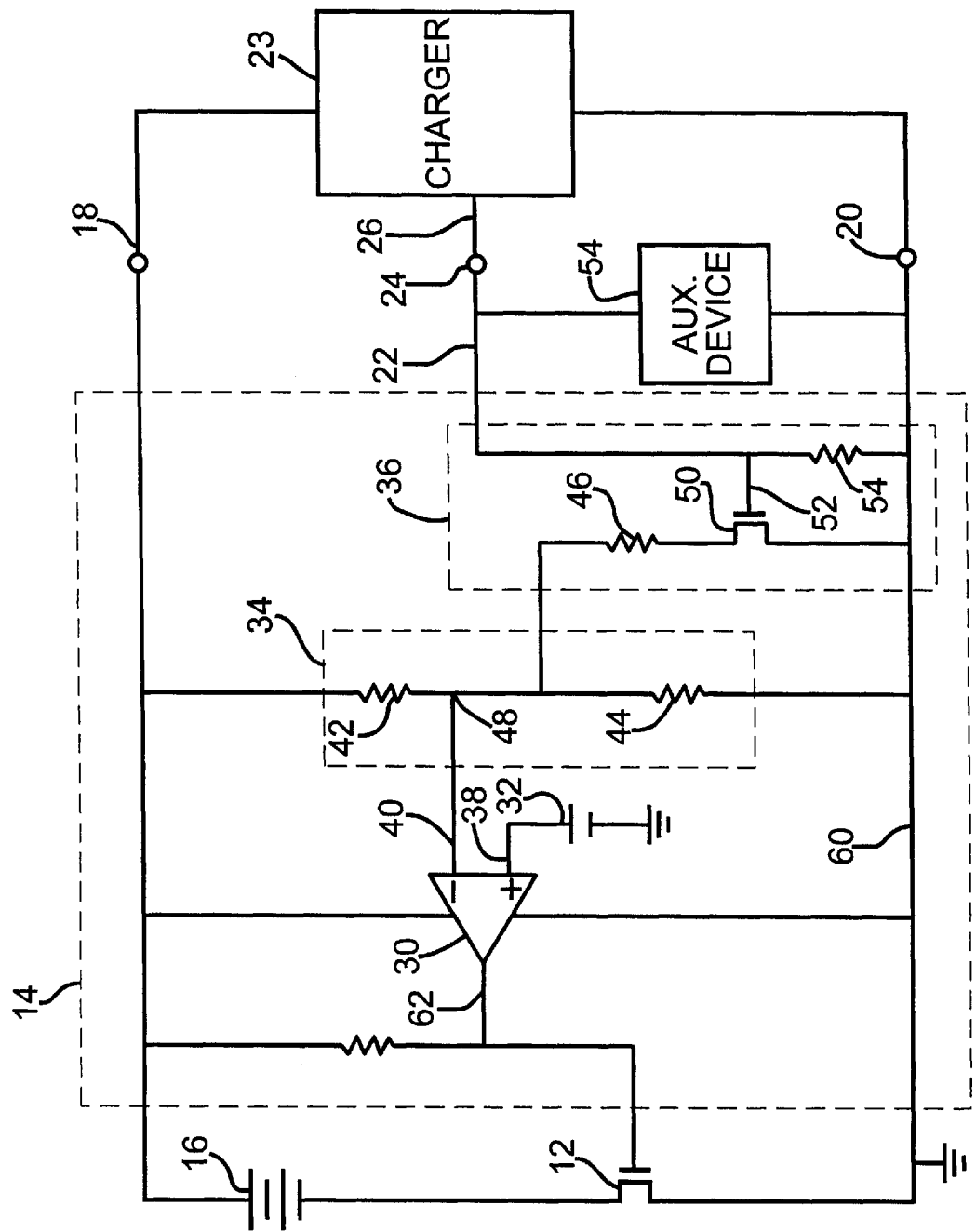
FIG. 1 illustrates a prior art over voltage disconnect circuit.
Figure 2:
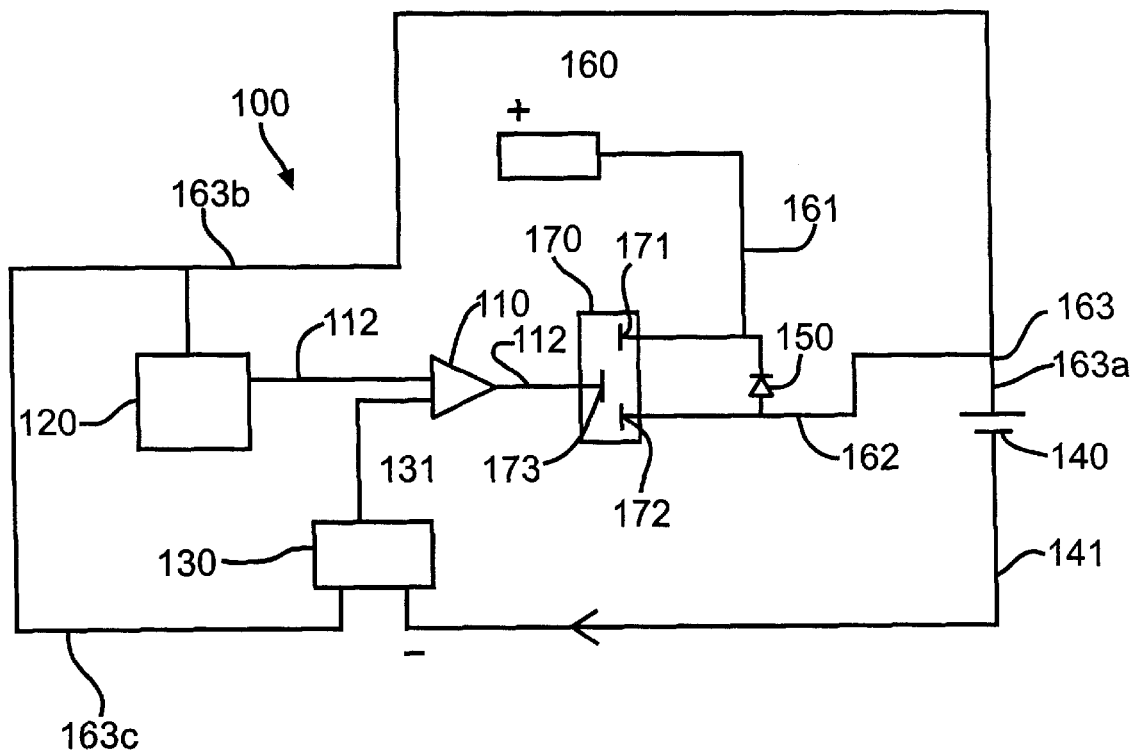
FIG. 2 is a schematic drawing of the present over voltage disconnect circuit.

The circuitry of the present invention is illustrated in FIG. 2. In particular, the present over voltage disconnect circuit 100 has a comparator 110, a first voltage divider 120, a second voltage divider 130, a cell or battery 140, a discharge unit 150, a charger 160, and a switch unit 170 having a source 171, a drain 172, and a gate 173. The charger 160 transmits a charge through the switch unit 170 to the cell 140. When the cell 140 is in a charge condition the cell voltage will increase over time and so will the circuit voltage. With this fundamental understanding we can proceed with a more detailed explanation of the present invention.

The switch unit 170 can be any conventional field effect transistor (FET). A preferred transistor is a p-channel enhanced-mode MOSFET. The charge initiates from the charger 160 and passes along line 161 to the source 171 of the switch unit 170. From the switch unit 170, the charge proceeds through to the drain 172 and goes along line 162 to line 163. At line 163, the charge goes to (1) line 163a which leads the charge to cell 140, (2) line 163b which leads the charge to the first voltage divider 120, and (3) eventually to line 163c which leads the charge to the second voltage divider 130.

When the charge goes across the cell 140, the charge becomes an exhausted charge and goes to line 141.

Figure 3:
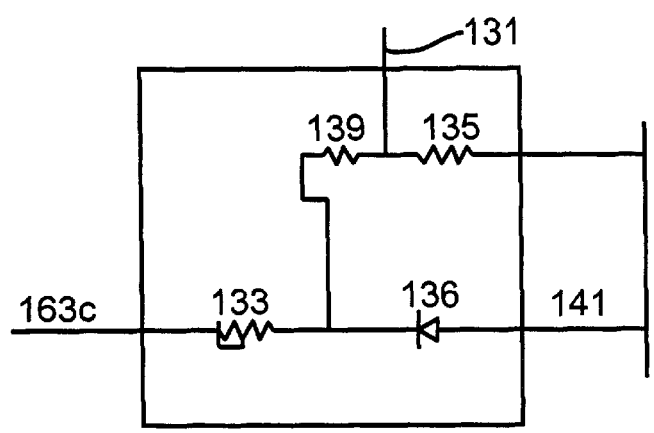
FIG. 3 is an exploded view of the second voltage divider circuit.

The second voltage divider 130 receives the charge through line 163c. The second voltage divider 130 is a combination of at least three resistors, 133, 134, and 135 and a low voltage reference component 136, as shown in FIG. 3. Resistor 133 is in parallel with the low voltage reference component 136 and resistor 134, and resistors 134 and 135 divide the charge to generate the predetermined charge.

The predetermined charge is proportionally below and less than the rated voltage or desired voltage (RV/DV) of the cell 140. Proportionally below the rated voltage means that if the rated voltage is 4.25, then a resulting charge would be, for example, 10 percent (preset ratio–PR) of the rated voltage, which is 0.425 V. The resulting charge is, however, not the predetermined charge because it is just proportionally below the rated voltage. The predetermined charge is obtained by decreasing the resulting charge by a preset value (PV), for example, 0.005 V. That means, the predetermined charge would be 0.420 V. Accordingly, the predetermined charge can be summed up as follows:

$$\text{Predetermined Charge} = (RV/DV*PR) - PV\ 0.423 = (4.25*0.10) - 0.002$$

The preset ratio (PR) can be any value ranging between 0.0001 to 0.9999, but preferably the ratio is about 0.10. The preset value (PV) can be any value that decreases the resulting charge by a value that allows the switch unit 170 sufficient time to terminate charge from over charging the cell 140. A preferred preset value is anywhere from 0.002 to 0.010. These values are merely arbitrary values that correspond to the resistors and diode parameters set forth in the second voltage divider 130.

The predetermined charge goes to line 131 which in turn directs the predetermined charge to a first of at least two inputs for the comparator 110.

The first voltage divider 120 receives the charge from line 163b and generate a second charge that is a preset ratio (PR) of the charge. Normally, the second charge is ten percent (any preset ratio can be used but 10% is so easy to use in this application) of the charge, for example, the charge would be 4.00 V and the second charge would then be 0.40 V. In any case, the second charge is transmitted along line 122 which in turn directs the second charge to a second of at least two inputs for the comparator 110.

The comparator 110 compares the predetermined charge to the second charge, and transmits, along line 112, an operational signal to the gate 173 of the switch unit 170. Assuming the switch unit 170 is a p-channel MOSFET, if the second charge is less than the predetermined charge, the comparator 110 transmits a negative potential signal to gate 173. That allows the charge to pass through the source 171 and the drain 172 to the cell 140.

In contrast, if the second charge is equal to or greater than the predetermined charge, the comparator 110 transmits a positive potential signal to gate 173. That results in the switch unit 170 opening which limits the voltage and current to the cell or battery 140.

This invention protects the cell or battery 140 from over voltage charging and is designed not to use, even if they are available, a memory unit to set the desired voltage.

The discharge unit 150 is a Schottky barrier diode that provides a path, along line 162, with a low resistance and low voltage drop across the internal junction of the discharge unit 150. This provides a current path for the cell or battery 140 to be discharged.

While the preferred embodiment of the invention has been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. An overvoltage disconnect circuit for a lithium ion battery and/or cell, the lithium ion battery having at least one lithium ion battery cell having a rated voltage or a desired voltage, an input terminal, and being chargeable by a charger; the overvoltage disconnect circuit comprising:
    a) a switch unit having a source, a drain and a gate, the charger connects to the source, the drain connects to the cell, a first voltage divider, and a second voltage divider, and a comparator connects to the gate;
    b) the first voltage divider receives a charge generated by the charger and generates a second charge, the second charge being proportionally below the voltage of the charger;
    c) the second voltage divider receives the charge and generates a predetermined charge, the predetermined charge is proportionally below and less than the rated voltage or the desired voltage of the cell;
    d) the comparator compares the predetermined charge to the second charge;
    e) wherein if the second charge is below the predetermined charge, the comparator transmits an operational signal to the switch unit that allows the charger to continue charging the lithium ion cell; and
    f) if the second charge is equal to or greater than the predetermined charge, the comparator transmits the operational signal to the switch unit to disconnect the charger from charging the lithium ion cell.

2. The over voltage circuit of claim 1 wherein a memory device is not required for the operation of the over voltage circuit.

3. The over voltage circuit of claim 1 wherein the switch unit is a field effect transistor.

4. The over voltage circuit of claim 3 wherein the field effect transistor is a p-channel MOSFET.

5. The over voltage circuit of claim 3 wherein the field effect transistor is a n-channel MOSFET.

6. The over voltage circuit of claim 1 wherein the first voltage divider is a 10 to 1 divider.

7. The over voltage circuit of claim 1 wherein the first voltage divider is a two resistor system.

8. The over voltage circuit of claim 1 wherein the second voltage divider comprises at least three resistors and at least one low voltage reference component.

9. The over voltage circuit of claim 1 wherein the battery is within a patient and is charged within the patient.

10. The over voltage circuit of claim 1 wherein the battery is outside a patient and is charged outside the patient.

11. An overvoltage disconnect circuit for a lithium ion battery and/or cell, the lithium ion battery having at least one lithium ion battery cell having a rated voltage or a desired voltage, an input terminal, and being chargeable by a charger; the overvoltage disconnect circuit comprising:
    a) a switch unit having a source, a drain and a gate, the charger connects to the source, the drain connects to the cell, a first voltage divider, and a second voltage divider, and a comparator connects to the gate;
    b) the first voltage divider receives a charge generated by the charger and generates a second charge, the second charge being proportionally below the voltage of the charger;
    c) the second voltage divider receives the charge and generates a predetermined charge, the predetermined charge is proportionally below the rated voltage or the desired voltage of the cell;
    d) the comparator compares the predetermined charge to the second charge;
    e) wherein if the second charge is below the predetermined charge, the comparator transmits an operational signal to the switch unit that allows the charger to continue charging the lithium ion cell; and
    f) if the second charge is equal to or greater than the predetermined charge, the comparator transmits the operational signal to the switch unit to disconnect the charger from charging the lithium ion cell.

12. The over voltage circuit of claim 11 wherein a memory device is not required for the operation of the over voltage circuit.

13. The over voltage circuit of claim 11 wherein the switch unit is a field effect transistor.

14. The over voltage circuit of claim 13 wherein the field effect transistor is a p-channel MOSFET.

15. The over voltage circuit of claim 13 wherein the field effect transistor is a n-channel MOSFET.

16. The over voltage circuit of claim 11 wherein the first voltage divider is a 10 to 1 divider.

17. The over voltage circuit of claim 11 wherein the first voltage divider is a two resistor system.

18. The over voltage circuit of claim 11 wherein the second voltage divider comprises at least three resistors and at least one low voltage reference component.

19. The over voltage circuit of claim 11 wherein the battery is within a patient and is charged within the patient.

20. The over voltage circuit of claim 11 wherein the battery is outside a patient and is charged outside the patient.

* * * * *